United States Patent Office 3,542,761
Patented Nov. 24, 1970

3,542,761
FURANOSIDE ETHER ESTERS
Alberto Rossi, Oberwil, Basel-Land, Switzerland, assignor to Ciba Corporation, Summit, N.J., a corporation of Delaware
No Drawing. Filed Sept. 4, 1968, Ser. No. 757,498
Claims priority, application Switzerland, Sept. 11, 1967, 12,702/67; Apr. 25, 1968, 6,160/68
Int. Cl. C07c 47/18
U.S. Cl. 260—210                 15 Claims

ABSTRACT OF THE DISCLOSURE

D-glucofuranosides of the formula

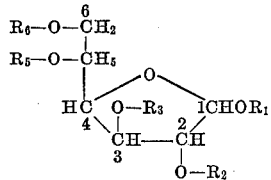

in which $R_1$ represents a lower aliphatic hydrocarbon radical which may contain hydroxyl or lower alkoxy groups, or a cycloaliphatic hydrocarbon radical which may contain lower alkyl groups, or a benzyl radical whose phenyl ring may be substituted, $R_2$ represents hydrogen or the acyl residue of an organic carboxylic acid, $R_3$ represents hydrogen or a lower aliphatic hydrocarbon radical, and $R_5$ and $R_6$ each represents a benzyl radical whose phenyl ring may be substituted, with the proviso that when $R_3$ stands for a lower aliphatic hydrocarbon radical, $R_1$ and $R_3$ together contain at least 3 carbon atoms, and salts of such compounds containing a salt-forming group, show antiinflammatory properties.

SUMMARY OF THE INVENTION

The present invention concerns D-glucofuranosides of the formula

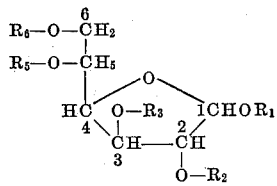

(I)

in which $R_1$ represents a lower aliphatic hydrocarbon radical which may contain hydroxyl or lower alkoxy groups, or a cycloaliphatic hydrocarbon radical which may contain lower alkyl groups, or a benzyl radical whose phenyl ring may be substituted, $R_2$ represents hydrogen or the acyl residue of an organic carboxylic acid, $R_3$ represents hydrogen or a lower aliphatic hydrocarbon radical, and $R_5$ and $R_6$ each represents a benzyl radical whose phenyl ring may be substituted, with the proviso that when $R_3$ stands for a lower aliphatic hydrocarbon radical, $R_1$ and $R_3$ together contain at least 3 carbon atoms, and salts of such compounds containing a salt-forming group, as well as pharmaceutical preparations containing these compounds; they can be used as antiphlogistic agents.

DESCRIPTION OF THE PREFERRED EMBODIMENTS

The above compounds have the configuration of D-glucofuranose; the etherified hydroxyl group in 1-position may have the $\alpha$- or the $\beta$-configuration, and the compounds of this invention may be in the form of pure anomers or of mixtures of anomers.

The lower aliphatic hydrocarbon radical $R_1$ is in the first place a lower alkyl group or a lower alkenyl group; these radicals, especially a lower alkyl group, may be substituted by one, two or more hydroxy or lower alkoxy groups. Cycloaliphatic hydrocarbon radicals are especially cycloalkyl groups containing, for example, 3 to 8, preferably 5 or 6 carbon atoms in the ring, or cycloalkenyl groups containing, for example, 5 to 8, preferably 5 or 6 carbon atoms in the ring; cycloaliphatic hydrocarbon radicals may be substituted by lower alkyl groups. Substituents of the phenyl ring in optionally substituted benzyl groups are, for example, lower alkyl and/or etherified or esterified hydroxyl groups, such as lower alkoxy or lower alkylenedioxy groups and/or halogen atoms, as well as "pseudohalogen" groups, such as trifluoromethyl groups.

An acyl radical $R_2$ of an organic carboxylic acid is preferably the radical of an aliphatic, aromatic or araliphatic carboxylic acid, such as a lower alkanecarboxylic or alkenecarboxylic acid, for example, acetic or propionic acid, and especially of a lower alkanedicarboxylic acid containing, for example, 2 to 7, preferably 3 to 6 carbon atoms, or of an equivalent lower alkene-dicarboxylic acid containing, for example, 4 to 7 carbon atoms; such acids are, for example, malonic, 2-methylsuccinic, glutaric, 3-methylglutaric, 3-ethylglutaric, adipic and pimelic acid and in first place succinic acid, as well as maleic and fumaric acid.

A lower aliphatic hydrocarbon radical $R_3$ is in the first place a lower alkyl or lower alkenyl radical.

A benzyl radical $R_5$ or $R_6$, which may be substituted in the phenyl nucleus, may be substituted by the groups and/or atoms mentioned above.

The residues, radicals or compounds designated below and hereinafter as "lower," contain preferably up to 7, especially up to 4 carbon atoms.

Lower alkyl radicals are, for example, methyl, ethyl, n-propyl, isopropyl, n-butyl, isobutyl, secondary butyl, tertiary butyl, n-pentyl, isopentyl, neopentyl, n-hexyl, isohexyl, n-heptyl or isoheptyl radicals. Lower alkenyl radicals are, for example, allyl or methallyl or 2-butenyl radicals. The lower alkoxy groups occurring as substituents in such lower aliphatic hydrocarbon, especially lower alkyl, radicals are, for example, methoxy, ethoxy, n-propoxy, isopropoxy, n-butoxy, isobutoxy, n-pentoxy or n-hexoxy radicals. Lower aliphatic hydrocarbon radicals substituted by hydroxyl or lower alkoxy groups are in the first place hydroxy- or lower alkoxy-lower alkyl radicals, in which the hydroxyl or lower alkoxy groups are separated preferably by at least 2 carbon atoms from the oxygen atom that carries such a substituted lower aliphatic radical, such as 2-hydroxyethyl, 2-hydroxypropyl, 3-hydroxypropyl, 2-methoxyethyl, 2-ethoxyethyl, 2-methoxy-propyl, 3-methoxypropyl or 3-ethoxypropyl, as well as hydroxymethyl radicals.

Cycloalkyl radicals are cyclopropyl, cyclobutyl, cyclopentyl, cyclohexyl or cycloheptyl radicals which may carry one or several lower alkyl groups, especially methyl groups, as substituents. Cycloalkenyl radicals are, for example, 2- or 3-cyclopentenyl, 2- or 3-cyclohexenyl or 2-, 3- or 4-cycloheptenyl radicals, optionally substituted as indicated above.

The phenyl nucleus of benzyl radicals may carry one, two or several substituents which may be identical or different. Halogen atoms are in the first place those having an atomic weight of 19 to 80, that is to say fluorine, chlorine or bromine atoms. Benzyl radicals, monosubstituted in the nucleus carry a substituent preferably in the para-position.

The new compounds possess valuable pharmacological properties. More especially, they have an anti-inflamatory effect as can be shown in animal tests, for example, on the rat, by intraperitoneal administration of a dose from about 0.03 to about 0.3 g./kg. Thus, they show, for example, a stronger effect in the turpentine pleuritis test (performed in analogy to the test described by Spector in J. Path. Bact., volume 72, page 367 [1956]) than known compounds of similar structure. Furthermore, as can be shown in animal tests, for example, on the guinea pig, they have antiallergic effects; compared with known compounds, they display on isolated smooth-muscle organs, a stronger antagonism towards histamine, serotonine, bradykinin and arachidonic acid peroxide. Furthermore, the activity of the new compounds lasts much longer than that of known compounds having a similar activity spectrum. The new compounds are, therefore, useful as anti-inflammatory, particularly as antiexudative or anti-edematous agents, or as antiallergics, and are also valuable intermediates, for example, for the manufacture of other, especially pharmacologically active compounds.

Particularly valuable anti-inflammatory properties are found in D-glucofuranosides of the formula

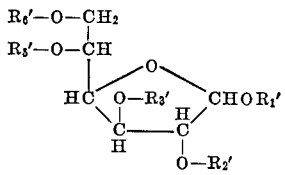

(Ia)

in which $R_1'$ represents a lower alkyl group, $R_2'$ stands for a hydrogen atom or the acyl radical of a lower alkane-dicarboxylic acid, especially the succinyl radical, $R_3'$ is a hydrogen atom or a lower alkyl or the allyl radical, and $R_5'$ and $R_6'$ each represents a benzyl group which may contain, preferably in the para-position, a lower alkyl, especially methyl radical or a halogen, especially a chlorine atom, with the proviso that, when $R_3'$ represents a lower alkyl group, $R_1'$ and $R_3'$ together contain at least 3 carbon atoms, as well as salts, especially non-toxic salts, such as non-toxic ammonium, alkali metal or alkaline earth metal salts of compounds, in which $R_2'$ represents the acyl radical of a lower alkane-dicarboxylic acid, especially a succinyl radical.

Particularly pronounced pharmacological properties of the kind mentioned above are found in lower alkyl-3-O-$R_3''$-5,5-di-O-R-D-glucofuranosides, in which $R_3''$ represents a hydrogen atom or a lower alkyl group, and R stands for a benzyl radical which may be substituted by halogen, especially chlorine, preferably in the 4-position, with the proviso that, when $R_3''$ stands for a lower alkyl radical, this radical together with the lower alkyl group of the substituent in 1-position contains at least 3 carbon atoms, and their 2-O-succinyl compounds and their salts, for example, those of the kind referred to above, especially ethyl-3-O-n-propyl-5,6-di-O-(4-chlorobenzyl)-D-glucofuranoside, in the form of the mixture of anomers or of the pure anomers, and its 2-O-succinyl compound and its salts, especially of the kind mentioned above, which on intraperitoneal administration to the rat in a dose from 0.03 to 0.3 g./kg. produce a pronounced anti-inflammatory effect of prolonged duration.

The compounds of this invention may be manufactured in known manner, for example, by reacting a D-glucofuranose of the formula

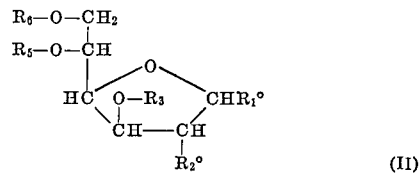

(II)

in which $R_1^o$ represents a free hydroxyl group and $R_2^o$ a free hydroxyl group or an acyloxy group, in which acyl is the radical of an organic carboxylic acid, or $R_1^o$ and $R_2^o$ together stand for the grouping of the formula —O—X—O—, in which X represents an optionally substituted methylene group, with a compound of the formula $R_1$—OH in the presence of an acid and, if desired, saturating in a resulting compound an unsaturated lower aliphatic hydrocarbon residue and/or, if desired, converting in a resulting compound an acyloxy radical in 2-position into a free hydroxyl group or another acyloxy group and/or esterifying a free hydroxyl group in 2-position with an organic carboxylic acid.

The acyl radical of an organic carboxylic acid is, for example, a residue of one of the acids mentioned above.

A group X in the starting material of the Formula II is an unsubstituted, monosubstituted or preferably disubstituted methylene group. Substituents are in the first place unsubstituted or substituted monovalen or divalent aliphatic hydrocarbon radicals, preferably lower alkyl, for example, ethyl, n-propyl, isopropyl or n-butyl, especially methyl radicals, or lower alkylene radicals containing 4 to 6 chain carbon atoms, such as 1,4-butylene or 1,5-pentylene radicals. If desired, these hydrocarbon radicals may be substituted, for example, by lower alkyl, hydroxyl or lower alkoxy groups or by halogen atoms, or by aromatic groups, such as phenyl groups which themselves may be substituted, for example, by lower alkyl, hydroxyl or lower alkoxy groups or halogen atoms. Further substituents of the methylene group X are, for example, aromatic radicals, such as phenyl groups, which may be substituted as indicated above, or free or functionally modified, such as esterified, carboxyl groups, for example, carbo-lower alkoxy, such as carbomethoxy or carbethoxy groups.

An acid used in the reaction is a Lewis acid, especially an inorganic acid, such as a mineral acid, advantageously hydrochloric acid, as well as hydrobromic or sulfuric acid, or an organic acid, such as an organic sulfonic acid, such as p-toluenesulfonic acid, or a mixture of acids, for example, a mixture of hydrochloric and acetic acid.

The reaction of a starting material of the Formula II, in which $R_1^o$ is a free and $R_2^o$ a free or acylated hydroxyl group, with an alcohol of the formula $R_1$—OH is preferably performed at a mineral acid concentration of about 0.05 N to about 1 N, more especially, of about 0.1 N to about 0.5 N.

The above reaction is preferably carried out in the presence of a diluent; among others, the alcoholic reagent of the formula $R_1$—OH may at the same time also serve as such diluent. If desired, a mixture of solvents or diluents may be used.

The compounds of this invention are also obtained, when in a D-glucofuranose of the above Formula II, in which $R_1^o$ is a reactive esterified hydroxyl group and $R_2^o$ stands for an acyloxy radical, in which acyl is the acyl radical of an organic carboxylic acid, the radical $R_1^o$ is exchanged for the radical $OR_1$, and, if desired, the optional steps are carried out.

A reactive, esterified hydroxyl group is in the first place a hydroxy group esterified by a hydrohalic acid, so that $R_1^o$ is in the first place a halogen atom, especially a bromine atom.

The exchange of a reactive, esterified hydroxyl group $R_1^0$ is preferably carried out by treating the starting material with a compound of the formula $R_1$—OH in the presence of an acid acceptor, being, for example, a silver, lead or mercury salt or a corresponding oxide, or a tertiary base, in the first place a metal derivative of a compound of the formula $R_1$—OH, such as a corresponding alkali metal, for example, sodium or potassium, salt or an alkaline earth metal, for example, magnesium, salt, or a silver compound.

The above reaction is preferably carried out in the presence of a solvent; the alcoholic reagent may, if desired, be used as diluent.

The compounds of this invention are also obtained, when a D-glucofuranoside of the formula

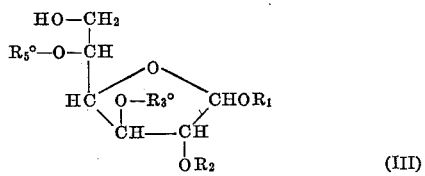

(III)

in which $R_3^0$ represents a lower aliphatic hydrocarbon radical, is reacted with a reactive ester of a compound of the formula $R_6$—OH, and, if desired, the optional steps are carried out.

A free hyrdoxyl group in 6-position of a starting material of the Formula III may be etherified in known manner without substantially affecting a free hydroxyl group in 2-position, for example, by treatment with approximately an equivalent amount of a reactive ester of an alcohol of the formula $R_6$—OH in the presence of a suitable basic reagent. A reactive ester is especially a suitable halide, for example, chloride or bromide, but it may also be a suitable ester with a strong organic sulfonic acid, such p-toluenesulfonic acid. Suitable basic reagents are, for example, hydroxides of alkali or alkaline earth metals, such as sodium or potassium hydroxide, which are preferably used in equivalent proportions, or carbonates of alkali or alkaline earth metals, for example, sodium or potassium carbonate, or silver oxide. The reaction is preferably carried out in the presence of a sovlent, for example, dioxan or dimethylsulfoxide.

In a compound of the present invention, an unsaturated lower aliphatic hydrocarbon radical, such as a lower alkenyl, for example, allyl radical may be saturated, for example, by treatment with catalytically activated hydrogen, e.g. hydrogen in the presence of a palladium catalyst.

When $R_2$ in a compound of this invention represents an acyl radical, it may be replaced by hydrogen, for example, by treatment with an alkaline reagent, such as a hydroxide or carbonate of an alkali or alkaline earth metal, or with silver oxide, in an aqueous or alcoholic medium.

In a compound, in which $R_2$ represents a hydrogen atom, the free hydroxyl group may be esterified by treatment with an acylating agent capable of introducing the acyl radical of an organic carboxylic acid in known manner. This reaction is preferably carried out on compounds, in which $R_3$ represents a lower aliphatic hydrocarbon radical. Suitable acylating agents are acid derivatives (in the case of dicarboxylic acids, for example, their mono-acid derivatives), especially anhydrides (also inner anhydrides, such as corresponding ketenes), or halides, especially chlorides. Preferably, the reaction is carried out with an anhydride, for example, succinic anhydride, in the presence of an acidic or basic catalyst, for example, pyridine. The reaction with a carboxylic acid halide, for example, a chloride, such as succinic acid monochloride, may be carried out in the presence of an acid-accepting condensing agent, such as a tertiary base or sodium acetate. If desired, a free hydroxyl group may be esterified with the aid of carboxylic acids in the presence of a suitable condensing agent, such as dicyclohexylcarbodiimide, or of a reactive ester of a carboxylic acid, such as an ester with N-hydroxyamino or N-hydroxyimino compounds, for example, N-hydroxysuccinimide.

Compounds containing an acyl radical $R_2$ with salt-forming groups, for example, free carboxyl groups, are obtained according to the reaction conditions in free form or as salts, which forms can be converted one into the other. Salts of compounds containing free carboxyl groups are, for example, metal salts, especially alkali metal salts, for example, sodium or potassium salts, or alkaline earth metal salts, for example, magnesium or calcium salts, or ammonium salts, for example, salts with ammonia or with organic bases, such as tri-lower alkylamines, for example, trimethylamine or triethylamine, especially the non-toxic salts of the above kind. Such salts, especially the alkali metal salts of the new compounds, are distinguished by their good solubility in water. Salts may also be used for purifying the free compounds. Salts are obtained, for example, by treating the free compounds with a hydroxide or carbonate of a metal or with ammonia or amines or with suitable ion exchange resins.

In view of the close relationship between the new compounds in free form and in form of their salts, what has been said above and hereinafter with reference to the free compounds or the salts concerns also the corresponding salts and free compounds, respectively, wherever possible and suitable.

The new compounds may be in the form of pure α- or β-anomers or of mixtures of anomers. The latter can be resolved into the two pure anomers on the basis of the physico-chemical differences of the constituents, for example, by chromatographic separation, e.g. thin layer chromatography, or by any other suitable separation procedure. Preferably, the more active of the two anomers is isolated.

The processes described above are performed by known methods, in the absence or preferably presence of diluents or solvents, if necessary with cooling or heating, under increased pressure and/or in the atmosphere of an inert gas, such as nitrogen.

The invention includes also those modifications of the process, in which an intermediate obtained at any stage of the process is used as starting material and any remaining process step/steps is/are carried out with it, or the process is interrupted at any stage, or in which a starting material is formed under the reaction conditions or is used in form of a reactive derivative thereof.

Preferred starting materials are those which furnish the products previously designated as being especially valuable.

The starting materials are known or, insofar as they are new, they can be manufactured in known manner. Thus, for example, they are obtained, when in a D-glucofuranose the hydroxy groups in 1- and 2-positions and, if desired, in 5- and 6-positions, are protected by introducing protective groups, for example, the group X, which is especially an isopropylidene or a benzylidene group. The hydroxyl group in 3-position can then be etherified by treatment with a reactive ester of a compound of the formula $R_3$—OH, for example, a lower aliphatic $R_3$-halide, e.g. $R_3$-chloride or $R_3$-bromide, and a corresponding $R_3$-sulfonyloxy compound, in the presence of a basic reagent, such as an alkali metal hydroxide, for example, sodium or potassium hydroxide, or of an alkali metal carbonate, for example, sodium or potassium carbonate. This etherification with a reactive ester of a compound of the formula $R_3$—OH may be performed under suitable conditions, for example, in the presence of silver oxide or of an alkali metal, for example, potassium, carbonate, also on the 3,5,6-trihydroxy compound without simultaneous etherification of the hydroxyl groups in 5- and 6-positions.

In an intermediate with protected hydroxyl groups in 5- and 6-positions obtained in this manner these groups may be selectively liberated, that is without liberating the hydroxyl groups in 1- and 2-positions, for example, by treatment with an acid, such as 60% aqueous acetic acid (for example at 35° C.) or aqueous ethanolic hydrochloric acid, and then themselves etherified by optionally substituted benzyl groups, for example, with the use of reactive esterified, optionally substituted benzyl alcohols, such as the corresponding halides, for example, chlorides or bromides, and sulfonyloxy, e.g. p-toluenesulfonyloxy, compounds, in the presence of basic reagents, such as an alkali metal hydroxide, for example, potassium hydroxide. If desired, this measure may be carried out stepwise, since the primary hydroxyl group in 6-position can be etherified before the hydroxyl group in 5-position, for example, on treatment with an approximately equivalent amount of a reactive ester of a compound of the formula $R_6$—OH in the presence of an approximately equivalent quantity of an alkali metal hydroxide or in the presence of silver oxide.

In a 5,6-dihydroxy compound containing in 3-position a free or preferably etherified hydroxyl group, the hydroxyl group in 6-position may be selectively esterified, for example, by treatment with a suitable organic sulfonyl halide, such as p-toluenesulfonyl chloride, and upon treatment with a suitable basic reagent, such as an alkali metal lower alkoxide, such as sodium ethoxide, the 5,6-epoxy compound may be formed. Splitting of the epoxide by means of an alcohol of the formula $R_6$—OH in the presence of a transesterifying catalyst, for example, an alkali metal, such as sodium compound of an alcohol of the formula $R_6$—OH, the 5-hydroxy-6-$R_6$-O-compound is obtained; in this compound, the free hydroxyl group in 5-position can be selectively etherified, for instance, by treatment with a reactive ester of a compound of the formula $R_5$—OH in the presence of a basic reagent, for example, one of those described above.

In the starting materials obtainable by the above procedures, in which $R_3$ preferably represents a lower aliphatic radical, the protective group for the two hydroxyl groups in positions 1 and 2 may be eliminated, for example, by treatment with an aqueous acid, such as hydrochloric acid. The two hydroxyl groups may then be esterified by treatment with a suitable derivative of an organic carboxylic acid, such as acetic acid, for example, an anhydride thereof, e.g. acetic anhydride, to form a 1,2-bis-O-acyl-compound, especially 1,2-bis-O-acetyl-compound. On reaction, for example, with bromine in glacial acetic acid, a 2-O-acyl, e.g. 2-O-acetyl compound containing a reactive, esterified hydroxyl group, e.g. a bromine atom, in 1-position is formed, which may be used as starting material.

A D-glucofuranoside starting material of the Formula III may be formed, for example, by providing temporary selective protection for the free hydroxyl group in 6-position in a 1,2-acetalyzed or ketalized 3-O-$R_3$-D-glucofuranoside, in which $R_3$ represents a lower aliphatic hydrocarbon radical, for example, by introducing the trityl group (e.g. by treatment with tritylchloride in the presence of pyridine) or by esterification with an organic sulfonic acid; the hydroxyl group in 5-position is then etherified by treatment with a reactive ester of an alcohol of the formula $R_5$—OH in the presence of a basic reagent, such as silver oxide, whereupon the hydroxyl group in 6-position may be liberated either together with the hydroxyl groups in positions 1 and 2, for example, by treatment with an acid, such as hydrochloric acid, or selectively, for example, by a short treatment with a suitable acid. From the product obtained in this manner the desired starting material is then accessible in the usual manner by glycosidation, for example, by treatment with an alcohol that furnishes the radical $R_1$ in the presence of hydrochloric acid.

At any suitable stage of the above process for the manufacture of the starting materials, a hydroxyl group in 3-position etherified with a suitable 2-alkenyl radical, such as the allyl radical, may be liberated, for example, by rearrangement of the double bond by treatment with an appropriate base, such as an alkali metal, for example, potassium tertiary butoxide, preferably in a suitable solvent, for example, dimethylsulfoxide, and oxidative-hydrolytic elimination of the 1-lower alkenyl, such as 1-propenyl group, for example, by treatment with potassium permanganate, preferably in a basic medium, such as an ethanolic alkali metal hydroxide, for example, potassium hydroxide, solution.

The new compounds or their salts may be used as medicaments, for example, in form of pharmaceutical preparations containing them in conjunction or admixture with an organic or inorganic, solid or liquid pharmaceutical excipients suitable, for example, for enteral or parenteral as well as topical administration. Suitable excipients are substances that are inert towards the new compounds, such as water, gelatin, sugars, for example, lactose, glucose or fructose, starches, such as corn, wheat or rice starch, stearic acid or salts thereof, such as calcium or magnesium stearate, talcum, vegetable oils, benzyl alcohols, gums, polyalkyleneglycols, propyleneglycol or other known medicinal excipients. The pharmaceutical preparations may be in solid form, for example, as tablets, dragees or capsules, or in liquid form e.g. as solutions, suspensions or emulsions. They may be sterilized and/or may contain auxiliary substances, such as preserving, stabilizing, wetting or emulsifying agents, salts for regulating the osmotic pressure or buffers. They may also contain further therapeutically valuable substances. The preparations are formulated by conventional methods.

The following examples illustrate the invention; temperatures are given in degree centigrated.

EXAMPLE 1

A solution of 149 g. of 1,2-O-isopropylidene-3-O-methyl-5,6-di-O-benzyl-α-D-glucofuranose in 3200 ml. of absolute ethanol is mixed at 10° with 412 ml. of a 7.75 N ethanolic solution of hydrogen chloride. The reaction mixture is kept for 17 hours at room temperature, then cooled to 0–5° and neutralized with a 10 N aqueous sodium hydroxide solution; the bulk of ethanol is then distilled off under reduced pressure at 40°, and the residue is extracted with chloroform. The chloroform phase is washed with an aqueous sodium bisulfite solution and with water, dried over sodium sulfate and evaporated under reduced pressure. The residue is distilled, to yield at 180°/0.02 mm. Hg the ethyl-3-O-methyl-5,6-di-O-benzyl-D-glucofuranoside of the formula

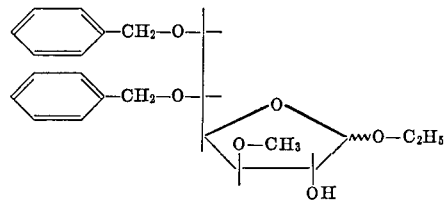

as a faintly yellowish oil; $[\alpha]_D^{20} = -31° \pm 1°$ (c.=1 in chloroform). The anomer mixture is resolved into the pure anomers by thin-layer chromatography, eluting with an 85:15-mixture of chloroform and ethyl acetate, on silica gel (RF 254, of Messrs. Merck, Darmstadt). The α-anomer has a $R_f$ value of 0.45; $[\alpha]_D^{20} = +34 \pm 1°$ (c.=1 in chloroform); the β-anomer an $R_f$ value of 0.23; $[\alpha]_D^{20} = -61° \pm 1°$ (c.=1 in chloroform).

EXAMPLE 2

A solution of 17.4 g. of 1,2-O-isopropylidene-3-O-methyl-5,6-di-O-benzyl-α-D-glucofuranose in 433 ml. of a 1 N solution of hydrogen chloride in sec.-butanol is kept for 17 hours at room temperature, then neutralized at 0–5° with a 10 N aqueous solution hydroxide solution; the bulk of sec.-butanol is distilled off under reduced pressure. The residue is extracted with chloroform and the chloroform extracts are washed with an aqueous sodium bisulfate solution and with water, dried over sodium sulfate and evaporated under vacuum. The residue is distilled and yields at 200°/0.05 mm. Hg the sec.-butyl-3-O-methyl-5,6-di-O-benzyl-D - glucofuranoside of the formula

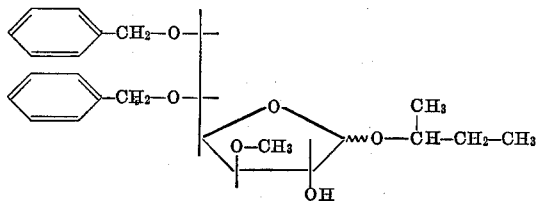

as a faintly yellowish oil; $[\alpha]_D^{20} = -24° \pm 1°$ (c.=1 in chloroform).

Example 3

A solution of 12.8 g. of 1,2 - O-isopropylidene-3-O-methyl-5,6-di-O-(4-methylbenzyl) - α - D-glucofuranose in 298 ml. of a 1 N ethanolic solution of hydrogen chloride is kept for 17 hours at room temperature, then neutralized at 0–5° with a 10 N aqueous sodium hydroxide solution. The bulk of ethanol is distilled off under reduced pressure, and the residue is extracted with chloroform. The chloroform extracts are washed with aqueous sodium bisulfite solution and with water, dried over sodium sulfate and evaporated under vacuum. The residue is distilled and yields at 195°/0.03 mm. Hg the ethyl-O-methyl - 5,6 - di-O-(4-methylbenzyl)-D-glucofuranoside of the formula

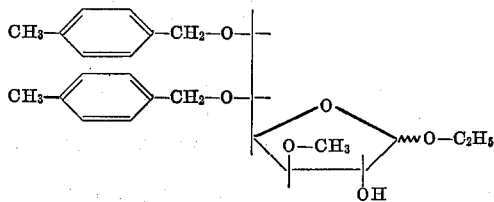

as a faintly yellowish oil; $[\alpha]_D^{20} = -14° \pm 1°$ (c.=1 in chloroform).

The starting material used above may be prepared as follows:

A solution of 23.4 g. of 1,2 - O-isopropylidene-3-O-methyl-α-D-glucofuranose in 50 ml. of absolute dioxan is mixed with 71.5 g. of powdered potassium hydroxide. In the course of 30 minutes, 93.8 g. of 4-methylbenzyl-chloride are added in dropwise while stirring, and the reaction mixture is allowed to react for 5 hours at 80°. The excess 4-methylbenzyl chloride is distilled off with steam, the residue is allowed to cool and is then extracted with chloroform. The chloroform solution is washed with water, dried over sodium sulfate and evaporated under reduced pressure. The residue is distilled and yields at 205°/0.02 mm. Hg the 1,2-O-isopropylidene-3-O-methyl-5,6 - di-O-(4-methylbenzyl)-α-D-glucofuranose as a faintly yellowish oil; $[\alpha]_D^{20} = -30° \pm 1°$ (c.=1 in chloroform).

Example 4

A solution of 11 g. of 1,2-O-isopropylidene-3-O-methyl - 5,6-di-O-(4-chlorobenzyl)-α-D-glucofuranose in 300 ml. of a 1 N solution of hydrogen chloride in ethanol is kept for 20 hours at room temperature and then neutralized at 0 to 5° with a 10 N aqueous sodium hydroxide solution. The bulk of ethanol is distilled off under reduced pressure and the residue is extracted with chloroform; the chloroform extract is washed with an aqueous sodium bisulfate solution and with water, dried over sodium sulfate and evaporated under vacuum; the residue is distilled to yield at 190°/0.01 mm. Hg the ethyl-3 - O - methyl-5,6-di-O-(4-chlorobenzyl)-D-glucofuranoside of the formula

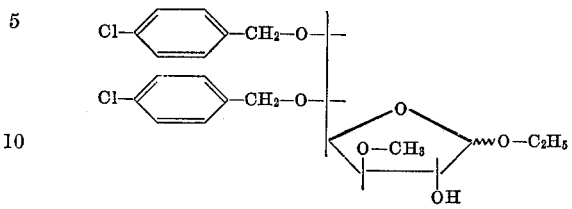

as a faintly yellowish oil; $[\alpha]_D^{20} = -14° \pm 1°$ (c.=1 in chloroform).

The starting material used above may be prepared as follows:

A solution of 42 g. of 1,2-O-isopropylidene-3-O-methyl-α-D-glucofuranose in 150 ml. of absolute dioxan is mixed with 128 g. of powdered potassium hydroxide. In the course of 30 minutes, 192 g. of 4-chlorobenzyl chloride are added dropwise while stirring and the reaction mixture is allowed to react for 5 hours at 80°. The excess 4-chlorobenzyl chloride is distilled off with steam, the residue is allowed to cool and is then extracted with chloroform. The chloroform solution is dried over sodium sulfate and evaporated under reduced pressure. The residue is distilled and yields at 235°/0.02 mm. Hg the 1,2 - O-isopropylidene-3-O-methyl-5,6-(4-chlorobenzyl)-α - D-glucofuranose as a faintly yellowish oil;

$$[\alpha]_D^{20} = -22° \pm 1°$$

(c.=1 in chloroform).

Example 5

A solution of 12.75 g. of 1,2 - O - isopropylidene-3-O-allyl - 5,6-di-O-benzyl-α-D-glucofuranose in 298 ml. of a 1 N ethanolic solution of hydrogen chloride is kept for 17 hours at room temperature and then neutralized at 0° to 5° with a 10 N aqueous sodium hydroxide solution. The bulk of ethanol is distilled off under reduced pressure and the residue is extracted with chloroform. The chloroform extract is washed with a saturated sodium bisulfite solution and with water, dried over sodium sulfate and evaporated under reduced pressure. The residue is distilled and yields at 200°/0.03 mm. Hg the ethyl-3-O-allyl-5,6-di-O-benzyl-D-glucofuranoside of the formula

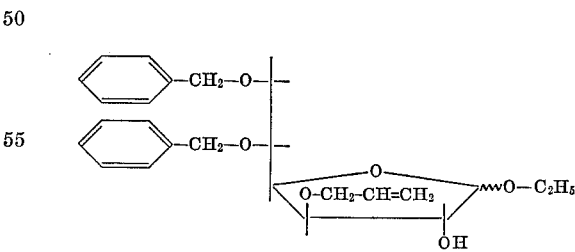

as a faintly yellowish oil; $[\alpha]_D^{20} = -18° \pm 1°$ (c.=1 in chloroform).

Example 6

A solution of 46 g. of 1,2-O-isopropylidene - 3-O-n-propyl - 5,6 - di - O-benzyl-α-D-glucofuranose in 1060 ml. of a 1 N ethanolic solution of hydrogen chloride is kept at 17 hours at room temperature, then neutralized at 0° to 5° with a 10 N solution of sodium hydroxide. The bulk of ethanol is distilled off at 40° under reduced pressure and the residue extracted with chloroform. The chloroform phase is washed with aqueous sodium bisulfite solution and with water, dried over sodium sulfate and evaporated under reduced pressure. The residue is distilled and yields at 220°/0.03 mm. Hg the ethyl-3-O-n propyl-5,6-di-O-benzyl-D-glucofuranoside of the formula

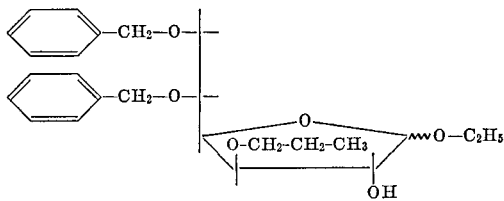

as a faintly yellowish oil: $[\alpha]_D^{20} = -24° \pm 10$ (c.=1 in chloroform).

The starting material used may be prepared as follows:

A solution of 82 g. of 1,2-O-isopropylidene-3-O-allyl-α-D-glucofuranose in 800 ml. of ethanol is hydrogenated in the presence of 1 g. of a 10%-palladium-on-carbon catalyst. The catalyst is then filtered off, the filtrate is evaporated and the residue is degassed in a high vacuum. A solution of 38.9 g. of the resulting 1,2-O-isopropylidene-3-O-n-propyl-α-D-glucofuranose;

$[\alpha]_D^{20} = -49° \pm 1°$ c.=1 in chloroform; in 150 ml. of absolute dioxan is mixed with 107 g. of powdered potassium hydroxide and, within 30 minutes, 114 ml. of benzyl chloride are added dropwise while stirring. The reaction mixture is allowed to react for 5 hours at 80°, the excess benzyl chloride is distilled off with steam and the residue, after cooling, is extracted with chloroform. The organic extract is washed with water, dried over magnesium sulfate and evaporated under reduced pressure. The residue is distilled and yields at 190°/0.015 mm. Hg the 1,2-O-isopropylidene-3-O-n-propyl-5,6-di-O-benzyl-α-D-glucofuranose as a colorless oil; $[\alpha]_D^{20} = -30° \pm 1°$ (c.=1 in chloroform).

Example 7

A solution of 40 g. of 1,2-O-isopropylidene-3-O-n-propyl-5,6-di-O-(4-chlorobenzyl)-α-D - glucofuranose in 900 ml. of a 1 N ethanolic solution of hydrogen chloride is kept for 17 hours at room temperature, cooled to 0°-5° and neutralized with a 10 N aqueous sodium hydroxide solution; the bulk of ethanol is distilled off under reduced pressure and the residue is extracted with chloroform. The chloroform extract is washed with an aqueous sodium bisulfite solution and with water, dried over sodium sulfate and evaporated under reduced pressure; the residue is distilled under a high vacuum to yield at 195°/0.01 mm. Hg the ethyl-3-O-n-propyl-5,6-di-O-(4-chlorobenzyl)-D-glucofuranoside of the formula

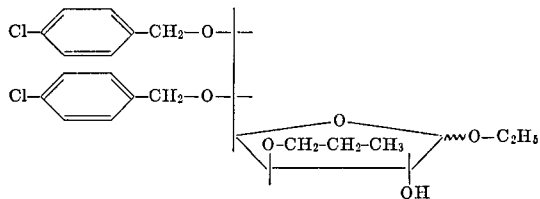

as a faintly yellowish oil; $[\alpha]_D^{20} = -17° \pm 1°$ (c.=1 in chloroform).

The resulting anomer mixture is resolved into the pure anomers by thin-layer chromatography on silica gel (RF 254, of Messrs. Merck, Darmstadt) and elution with an 85:15-mixture of chloroform and ethyl acetate. The α-anomer has an $R_f$ value of 0.50; $[\alpha]_D^{20} = +24° \pm 1°$ (c.=1 in chloroform); and the β-anomer an $R_f$ value of 0.24; $[\alpha]_D^{20} = -45° \pm 1°$ (c.=1 in chloroform).

The starting material used above may be prepared as follows:

A solution of 32 g. of 1,2-O-isopropylidene-3-O-n-propyl-α-D-glucofuranose in 100 ml. of absolute dioxan is mixed with 87.5 g. of powdered potassium hydroxide, and within 30 minutes a solution of 131 g. of 4-chlorobenzyl chloride in 50 ml. of absolute dioxan is added dropwise while stirring; the reaction mixture is allowed to react for 5 hours at 80°. The excess 4-chlorobenzyl chloride is distilled off with steam and, after cooling, the residue is extracted with chloroform. The organic extract is washed with water, dried over sodium sulfate and evaporated under reduced pressure. The residue is distilled and yields at 230°/0.015 mm. Hg the 1,2-O-isopropylidene - 3 - O - n-propyl-5,6-di-O-(4-chlorobenzyl)-α-D-glucofuranose as a faintly yellowish oil;

$[\alpha]_D^{20} = -22° \pm 1°$ (c.=1 in chloroform).

Example 8

A solution of 24.4 g. of 1,2-O-isopropylidene-3-O-allyl-5,6-di-O-(4-methylbenzyl)-α-D-glucofuranose in 600 ml. of a 1 N ethanolic hydrogen chloride solution is kept for 17 hours at room temperature, then cooled to 0°-5° and neutralized with a 10 N aqueous sodium hydroxide solution. The bulk of ethanol is distilled off at 40° under reduced pressure and the residue is extracted with chloroform. The chloroform phase is washed with an aqueous sodium bisulfite solution and with water, dried over sodium sulfate and evaporated under reduced pressure. The residue is distilled under a high vacuum and yields at 215°/0.02 mm. Hg the ethyl-3-O-allyl-5,6-di-O-(4-methylbenzyl)-D-glucofuranoside of the formula

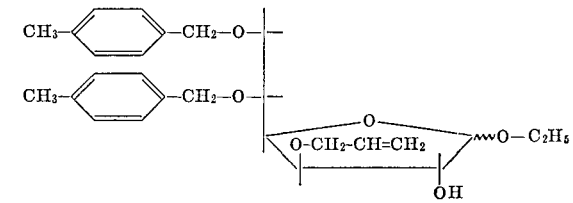

as a faintly yellowish oil; $[\alpha]_D^{20} = -10° \pm 1°$ (c.=1 in chloroform).

The starting material used above may be prepared as follows:

A solution of 20 g. of 1,2-O-isopropylidene-3-O-allyl-α-D-glucofuranose in 39 ml. of absolute dioxane is mixed with 55 g. of powdered potassium hydroxide. While stirring, 72 g. of 4-methylbenzyl chloride are dropped in within 30 minutes and the reaction mixture is allowed to react for 5 hours at 80°. The excess 4-methylbenzyl chloride is distilled off with steam; the cooled residue is extracted with chloroform, the organic solution washed with water, dried over sodium sulfate and evaporated under reduced pressure. The residue is distilled and yields at 200°/0.015 mm. Hg the 1,2-O-isopropylidene-3-O-allyl-5,6-di-O-(4-methylbenzyl)-α-D-glucofuranose as a faintly yellowish oil.

Example 9

A solution of 3.5 g. of 1,2-O-isopropylidene-5,6-di-O-benzyl-α-D-glucofuranose in 90 ml. of a 1 N ethanolic hydrogen chloride solution is kept for 17 hours at room temperature, cooled to 0°-5° and neutralized with a 10 N aqueous sodium hydroxide solution. The bulk of ethanol is distilled off at 40° C. under reduced pressure and the residue is extracted with chloroform. The chloroform extract is washed with an aqueous sodium bisulfite solution and with water, dried over sodium sulfate and evaporated under reduced pressure. The residue is distilled and yields at 215°/0.02 mm. Hg the ethyl-5,6-di-O-benzyl-D-glucofuranoside of the formula

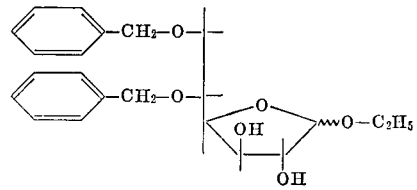

as a faintly yellowish oil; $[\alpha]_D^{20} = -17° \pm 1°$ (c.=1 in chloroform).

Example 10

A total of 20 g. of 1,2-O-isopropylidene-3-O-n-propyl-5,6-di-O-(4 - chlorobenzyl) - α - D - glucofuranose is dissolved at 10° in 500 ml. of a 1 N solution of hydrogen chloride in n-butanol. The reaction mixture is kept for 17 hours at room temperature, then cooled to 0°–5° and neutralized with a 10 N aqueous sodium hydroxide solution. The bulk of n-butanol is distilled off under reduced pressure and the residue is extracted with chloroform. The chloroform extract is washed with an aqueous sodium bisulfite solution and with water, dried over sodium sulfate and evaporated under reduced pressure. The residue is freed from residual solvent at 40° under a high vacuum, to yield the n-butyl-3-O-n-propyl-5,6 - di - O - (4 - chlorobenzyl)-D-glucofuranoside of the formula

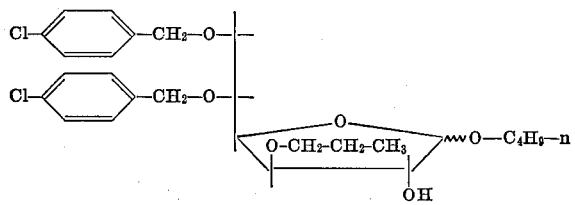

as a faintly yellowish oil; $[\alpha]_D^{20} = -21° \pm 1°$ (c.=1 in chloroform).

Example 11

A solution of 20 g. of 1,2-O-isopropylidene-3-O-methyl-5,6-di-O-(4-chlorobenzyl)-α-D-glucofuranose in 500 ml. of a 1 N solution of hydrogen chloride in n-butanol is kept for 17 hours at room temperature and then neutralized with a 10 N aqueous sodium hydroxide solution at 0°–5°. The bulk of n-butanol is distilled off under reduced pressure, the residue is extracted with chloroform and the chloroform extract is washed with an aqueous sodium bisulfite solution and with water, dried over sodium sulfate and evaporated under reduced pressure. The residue is freed from residual solvent at 40° under a high vacuum and yields the n-butyl-3-O-methyl-5,6-di-O-(4-chlorobenzyl)-D-glucofuranoside of the formula

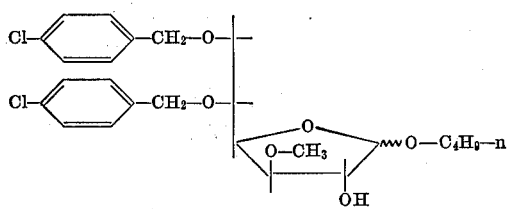

as a faintly yellowish oil; $[\alpha]_D^{20} = -20° \pm 1°$ (c.=1 in chloroform).

Example 12

A solution of 15 g. of ethyl-3-O-methyl-5,6-di-O-benzyl-D-glucofuranoside in 30 ml. of absolute pyridine is mixed with 4.1 g. of finely powdered succinic anhydride, and the reaction mixture is heated for 28 hours at 70° while stirring and with the exclusion of moisture, then evaporated at 55° under reduced pressure. The residue is mixed with 45 ml. of ice water and agitated for 5 minutes. The reaction mixture is extracted with ether; the ether solution is washed five times with 50 ml. portions each of ice-cooled 2 N hydrochloric acid and 50 ml. each of ice water, dried over sodium sulfate and evaporated under reduced pressure. The residue is freed form residual solvent at 20° under a high vacuum and yields the ethyl-2-O-(β-carboxy-propionyl)-3-O-methyl-5,6-di-O-benzyl - D - glucofuranoside of the formula

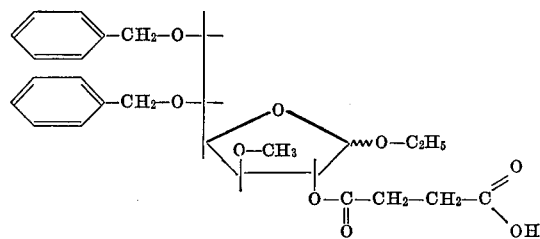

as a thick oil.

A solution of the above compound in an excess of a 1 N solution of sodium hydroxide in aqueous ethanol is allowed to stand for a short time, whereupon the ester is quantitatively hydrolyzed. The resulting ethyl-3-O-methyl-5,6-di-O-benzyl-D-glucofuranoside can be characterized by thin-layer chromatography. The α-anomer has an $R_f$ value of 0.45; $[\alpha]_D^{20} = +34° \pm 1°$ (c.=1 in chloroform); and the β-anomer an $R_f$ value of 0.23; $[\alpha]_D^{20} = -61° \pm 1°$ (c.=1 in chloroform).

A solution of the product in ether is agitated with the theoretical quantity of an aqueous sodium bicarbonate solution. The ether is evaporated under reduced pressure and the residue is diluted with water until a clear solution is formed which is lyophilized. Upon diluting the lyophilizate wth water, an at least 10% aqueous solution of the resulting sodium salt of ethyl-2-O-(β-carboxypropionyl)-3-O-methyl-5,6-di-O-benzyl-D-glucofuranoside can be prepared.

Example 13

A solution of 2.75 g. of succinic anhydride in 20 ml. of absolute pyridine is mixed with a solution of 10 g. of ethyl-3-O-n-propyl-5,6-di-O-(4-chlorobenzyl) - D - glucofuranoside in 20 ml. of absolute pyridine; the reaction mixture is heated for 48 hours at 70° with the exclusion of moisture, and then evaporated at 55° under reduced pressure. The residue is mixed with 45 ml. of ice water and agitated for 5 minutes, then extracted with ether. The ether phase is washed five times with 50 ml. each of ice water, dried over sodium sulfate and evaporated under reduced pressure. The residue is freed from residual solvent under a high vacuum and yields the ethyl-2-O-(β-carboxypropionyl)-3-O-n-propyl - 5,6 - di - O - (4-chlorobenzyl)-D-glucofuranoside of the formula

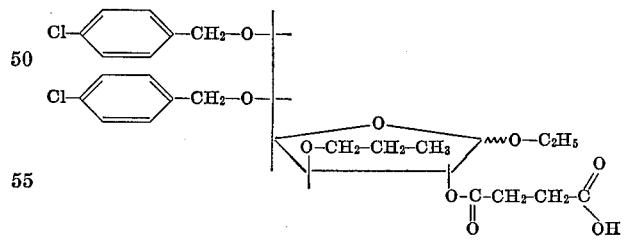

as a thick oil.

A solution of this compound in an excess of a 1 N sodium hydroxide solution in aqueous ethanol is allowed to stand for a short time, whereupon the ester is quantitatively hydrolyzed. The resulting ethyl-3-O-n-propyl-5,6-di-O-(4-chlorobenzyl)-D-glucofuranoside can be characterized by thin-layer chromatography. The α-anomer has an $R_f$ value of 0.50; $[\alpha]_D^{20} = +25° \pm 1°$ (c.=1 in chloroform); and the β-anomer an $R_f$ value of 0.24;

$$[\alpha]_D^{20} = -45° \pm 1°$$

(c.=1 in chloroform).

A solution of the product in ether is mixed with the theoretical quantity of sodium bicarbonate in water and freed from ether at 20° under reduced pressure. The residue is diluted with water until a clear solution is formed (9.5%), which can be lyophilized to yield the sodium salt of ethyl-2-O-(β-carboxypropionyl)-3-O-n-propyl-5,6-di-O-(4-chlorobenzyl)-D-glucofuranoside as a thick oil.

Example 14

A solution of 2.55 g. succinic anhydride in 20 ml. of absolute pyridine is mixed with a solution of 10 g. of ethyl-3-O-n-propyl-5,6-di-O-benzyl - D - glucofuranoside and heated for 48 hours at 70°, then evaporated under reduced pressure at 55°. The residue is stirred for 30 minutes with 45 ml. of ice water, then extracted with ether and the ether solution is washed five times with 50 ml. each of ice-cooled 2 N hydrochloric acid and 50 ml. each of ice water, dried over sodium sulfate and evaporated under reduced pressure. The residue is freed from residual solvent under a high vacuum to yield the ethyl-2-O-(β-carboxypropionyl)-3-O-n-propyl-5,6-di-O-benzyl - D - glucofuranoside of the formula

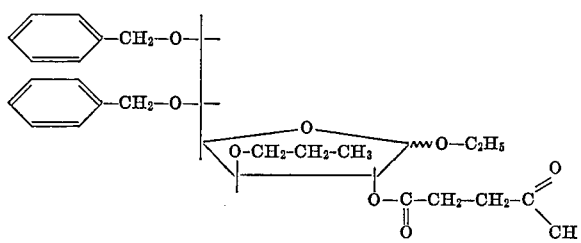

as a thick oil.

A solution of the above compound in an excess of a 1 N solution of sodium hydroxide in aqueous ethanol is allowed to stand for a short time, whereupon the ester is quantitatively hydrolyzed. The ethanol is evaporated, the residue is extracted with methylene chloride and the extract is evaporated to yield the ethyl-3-O-n-propyl-5,6-di-O-benzyl-D-glucofuranoside which is obtained as a faintly yellowish oil at 220°/0.03 mm. Hg on distillation of the residue; $[\alpha]_D^{20} = 24° \pm 1°$ (c.=1 in chloroform).

A solution of the product in ether is mixed with the theoretical quantity of sodium bicarbonate in water; the mixture is freed from ether at 40° under reduced pressure. The aqueous solution is lyophilized to yield the sodium salt of ethyl-2-O-(β-carboxypropionyl)-3-O-n-propyl-5,6-di-O-benzyl-D-glucofuranoside as a thick oil, which is soluble in water up to a concentration of 25%.

Example 15

While cooling with ice, 5 ml. of a 33% solution of hydrogen bromide in glacial acetic acid are added to 2.4 g. of 1,2-di-O-acetyl-3-O-n-propyl-5,6-di-O - (4 - chlorobenzyl)-D-glucofuranose and the mixture is kept for 2½ hours at room temperature, then poured into ice water and extracted with chloroform. The organic extract is washed with ice water and an ice-cold aqueous solution of sodium bicarbonate, dried over sodium sulfate and evaporated under reduced pressure at a bath temperature of 30–40°.

The residue, which contains the 2-O-acetyl-3-O-n-propyl-5,6-di-O-(4-chlorobenzyl)-D-glucofuranosyl bromide, is mixed with 50 ml. of a 1 N ethanolic solution of sodium ethoxide and kept for 16 hours at room temperature, then neutralized with 2 N aqueous acetic acid and extracted with chloroform. The organic extract is washed with ice water and an ice-cold concentrated aqueous sodium bicarbonate solution, dried over sodium sulfate and evaporated in a water-jet vacuum. The residue is distilled under a high vacuum, to yield at 195°/0.01 mm. Hg the ethyl-3-O-n-propyl-5,6-di-O-(4-chlorobenzyl)-D-glucofuranoside as a faintly yellowish oil;

$$[\alpha]_D^{20} = 17° \pm 1°$$

(c.=1 in chloroform).

The starting material may be prepared as follows:

A suspension of 5 g. of 1,2-O-isopropylidene-3-O-n-propyl-5,6-di-O-(4-chlorobenzyl)-α-D-glucofuranose in a mixture of 35 ml. of glacial acetic acid and 17.5 ml. of 1 N aqueous sulfuric acid is heated for 30 minutes at an internal temperature of 80° while being vigorously stirred under an atmosphere of nitrogen. The reaction mixture is then cooled to 10°, adjusted to a pH value of 2–3 with a 2 N aqueous sodium hydroxide solution and evaporated at a bath temperature of 35°. The concentrate is extracted with ether, and the organic phase is washed with a saturated aqueous sodium bicarbonate solution and with water until the washings are neutral, dried over magnesium sulfate and evaporated. The residue is the 3-O-n-propyl-5,6-di-O-(4-chlorobenzyl)-D-glucofuranose, with an $R_f$ value of 0.12 in the thin-layer chromatogram on silica gel in the system chloroform:ethyl acetate (85:15). It melts at 60° after recrystallization from a 1:3-mixture of toluene and hexane and cooling to —17°.

The 3-O-n-propyl-5,6-di-O-(4-chlorobenzyl)-D - glucofuranose is also obtained, when 15 g. of ethyl-3-O-n-propyl-5,6-di-O-(4-chlorobenzyl)-D-glucofuranoside is treated with 600 ml. of glacial acetic acid and 600 ml. of water; the mixture is heated for 16 hours at 70°, the excess acetic acid is distilled off, the aqueous residue is extracted with ether and the ether solution is worked up as described above.

A solution of 12.5 g. of 3-O-n-propyl-5,6-di-O-(4-chlorobenzyl)-D-glucofuranose in 13 ml. of absolute pyridine is cooled, mixed with 13 ml. of acetic anhydride and kept for 16 hours at room temperature, then diluted with 12 ml. of water while being cooled. The aqueous layer is decanted from the oil which has settled out and the latter is taken up in ether. The organic phase is agitated with 2 N hydrochloric acid, washed with water, dried over magnesium sulfate and evaporated. The residue is distilled and yields at 240°/0.05 mm. the desired 1,2-di-O-acetyl-3-O-n-propyl-5,6-di-O-(4-chlorobenzyl) - D - glucofuranose as a faintly yellowish oil.

Example 16

A solution of 2.1 g. of 3-O-n-propyl-5,6-di-O-(4-chlorobenzyl)-D-glucofuranose in 25 ml. of absolute ethanol containing 0.156 g. of hydrogen chloride gas is allowed to stand at room temperature for 1 hour under an atmosphere of nitrogen, then, while being cooled, adjusted to a pH value of 7–7.5 with 30% aqueous sodium hydroxide solution and filtered; the filter residue is washed with ethanol. The combined filtrates are concentrated to half the volume at 30° under reduced pressure and diluted with water. The oily precipitate is separated and distilled under a high vacuum to yield at 195°/0.01 mm. Hg the ethyl - 3-O - n-propyl-5,6-di-O-(4-chlorobenzyl)-D-glucofuranoside as a faintly yellowish oil; $[\alpha]_D^{20} = -17° \pm 1°$ (c.—1 in chloroform).

Example 17

Capsules, each containing 0.2 g. of active substance, may be manufactured as follows (for 10,000 capsules):

| Ingredients: | G. |
|---|---|
| Ethyl - 3 - O-n-propyl-5,6-di-O-(4-chlorobenzyl)-D-glucofuranoside | 2000 |
| Absolute ethanol | 200 |

The ethyl - 3-O-n-propyl-5,6-di-O-(4-chlorobenzyl)-D-glucofuranoside is mixed with the ethanol and the mixture filled into soft gelatin capsules on a suitable encapsulating machine.

I claim:

1. A member selected from the group consisting of D-glucofuranosides of the formula

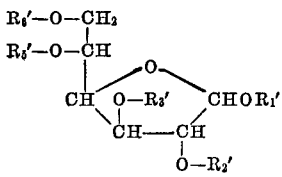

wherein $R_1'$ is lower alkyl, $R_2'$ is a member selected from the group consisting of hydrogen and the acyl residue of a lower alkanedicarboxylic acid, $R_3'$ is a member selected from the group consisting of hydrogen, lower alkyl and allyl, and each of the groups $R_5'$ and $R_6'$ is a member selected from the group consisting of benzyl, benzyl substituted by lower alkyl and benzyl substituted by halogeno, with the proviso that when $R_3'$ is lower alkyl, $R_1'$ and $R_3'$ together contain at least 3 carbon atoms, and the non-toxic salts of such compounds, in which $R_2'$ is the acyl radical of a lower alkanedicarboxylic acid.

2. A D-glucofuranoside as claimed in claim 1, wherein $R_1'$ and $R_3'$ have the significance given in claim 1, $R_2'$ is a member selected from the group consisting of hydrogen and the succinyl residue, and each of the groups $R_5'$ and $R_6'$ is a member selected from the group consisting of benzyl, benzyl substituted by methyl and benzyl substituted by chloro, with the proviso that when $R_3'$ is lower alkyl, $R_1'$ and $R_3'$ together contain at least 3 carbon atoms, and the non-toxic salts of such compounds, wherein $R_2'$ is the succinyl residue.

3. A D-glucofuranoside as claimed in claim 1, wherein $R_1'$ is lower alkyl, $R_2'$ is a member selected from the group consisting of hydrogen and the succinyl residue, $R_3'$ is a member selected from the group consisting of hydrogen and lower alkyl, and each of $R_5'$ and $R_6'$ stands for a member selected from the group consisting of benzyl and benzyl substituted by halogenen, with the proviso that when $R_3'$ is lower alkyl, the $R_1'$ and $R_3'$ together contain at least 3 carbon atoms, the non-toxic salts of such compounds, in which $R_2'$ is the succinyl residue.

4. A D-glucofuranoside as claimed in claim 1, wherein $R_1'$ is lower alkyl, $R_2'$ is a member selected from the group consisting of hydrogen and the succinyl residue, $R_3'$ is a member selected from the group consisting of hydrogen and lower alkyl, and each of $R_5'$ and $R_6'$ stands for a member selected from the group consisting of benzyl and benzyl substituted by chloro, with the proviso that when $R_3'$ is lower alkyl, $R_1'$ and $R_3'$ together contain at least 3 carbon atoms, and the non-toxic salts of such compounds, in which $R_2'$ is the succinyl residue.

5. A D-glucofuranoside as claimed in claim 1, wherein $R_1'$ is ethyl, $R_2'$ is hydrogen, $R_3'$ is methyl and each of $R_5'$ and $R_6'$ is benzyl.

6. A D-glucofuranoside as claimed in claim 1, wherein $R_1'$ is sec.-butyl, $R_2'$ is hydrogen, $R_3'$ is methyl and each of $R_5'$ and $R_6'$ is benzyl.

7. A D-glucofuranoside as claimed in claim 1, wherein $R_1'$ is ethyl, $R_2'$ is hydrogen, $R_3'$ is methyl and each of $R_5'$ and $R_6'$ is 4-chlorobnzyl.

8. A D-glucofuranoside as claimed in claim 1, wherein $R_1'$ is ethyl, $R_2'$ is hydrogen, $R_3'$ is allyl, and each of $R_5'$ and $R_6'$ is benzyl.

9. A D-glucofuranoside as claimed in claim 1, wherein $R_1'$ is ethyl, $R_2'$ is hydrogen, $R_3'$ is n-propyl and each of $R_5'$ and $R_6'$ is benzyl.

10. A D-glucofuranoside as claimed in claim 1, wherein $R_1'$ is ethyl, $R_2'$ is hydrogen, $R_3'$ is n-propyl and each of $R_5'$ and $R_6'$ is 4-chlorobenzyl.

11. A D-glucofuranoside as claimed in claim 1, wherein $R_1'$ is ethyl, $R_2'$ is hydrogen, $R_3'$ is n-propyl and each of $R_5'$ and $R_6'$ is 4-chlorobenzyl, the compound being in the form of its α-anomer.

12. A D-glucofuranoside as claimed in claim 1, wherein $R_1'$ is ethyl, $R_2'$ is hydrogen, $R_3'$ is n-propyl and each of $R_5'$ and $R_6'$ is 4-chlorobenzyl, the compound being in the form of its β-anomer.

13. A D-glucofuranoside as claimed in claim 1, wherein $R_1'$ is ethyl, $R_2'$ is hydrogen, $R_3'$ is allyl and each of $R_5'$ and $R_6'$ is 4-methylbenzyl.

14. A D-glucofuranoside as claimed in claim 1, wherein $R_1'$ is ethyl, each of $R_2'$ and $R_3'$ is hydrogen and each of $R_5'$ and $R_6'$ is benzyl.

15. A D-glucofuranoside as claimed in claim 1, wherein $R_1'$ is ethyl, $R_2'$ is the succinyl residue, $R_3'$ is n-propyl, and each of $R_5'$ and $R_6'$ is 4-chlorobenzyl.

References Cited

UNITED STATES PATENTS 3,157,634  11/1964  Druey et al. _____ 260—210

LEWIS GOTTS, Primary Examiner

J. R. BROWN, Assistant Examiner

U.S. Cl. X.R.

424—180